(12) United States Patent
Horng

(10) Patent No.: US 8,084,118 B1
(45) Date of Patent: Dec. 27, 2011

(54) PLATE MEMBER JOINING STRUCTURE

(76) Inventor: Chin-Hsing Horng, Kueishan Hsiang (TW)

( * ) Notice: Subject to any disclaimer, the term of this patent is extended or adjusted under 35 U.S.C. 154(b) by 0 days.

(21) Appl. No.: 12/870,801

(22) Filed: Aug. 28, 2010

(51) Int. Cl.
*B32B 3/10* (2006.01)
*B32B 15/04* (2006.01)

(52) U.S. Cl. ........ 428/172; 428/131; 428/132; 428/133; 428/457

(58) Field of Classification Search .......... 428/99, 428/131, 132, 133, 134, 137, 457, 596, 597, 428/156, 172; 52/675, 671
See application file for complete search history.

(56) References Cited

U.S. PATENT DOCUMENTS 5,656,353 A * 8/1997 Butler ................. 428/133

\* cited by examiner

*Primary Examiner* — Catherine A Simone

(57) ABSTRACT

A plate member joining structure having a high tensile strength is disclosed to include a metal plate member having opposing outer face and bonding face and binding units located on the bonding face, each binding unit having binding strips formed of a part of the bonding face and curvedly protruded from the bonding face and arranged in a spiral manner, and a plastic plate member directly molded on the bonding face of the metal plate member by insert molding to have the binding strips be embedded in the plastic plate member.

3 Claims, 8 Drawing Sheets

PLATE MEMBER JOINING STRUCTURE

BACKGROUND OF THE INVENTION

1. Field of the Invention

The present invention relates to plate member joining structures and more particularly, to a plate member joining structure formed of a metal plate member and a plastic plate member that are joined together by insert molding to avoid separation.

2. Description of the Related Art

Following fast development of science and technology, the design concept of commercial electronic products is focused on light, thin, short and small characteristics. Many electronic products (cell phone, notebook, PDA, etc.) are made convenient to carry by user. To enhance mobility, the weight of electronic products must be reduced. In order to reduce the weight, the shell or casing of an electronic product may be formed of an outer metal layer having a relatively thinner wall thickness and an inner plastic layer having a relatively thicker wall thickness. This design greatly reduces the product weight while providing excellent tensile strength. Further, the outer metal layer facilitates surface treatment by an electroplating or coating technique. Therefore, metal is commonly used for the casing or the outer layer of the casing for commercial electronic products.

When setting a plastic plate member in a metal plate member to give a support, an adhesive is usually used to bond the two plate members together. However, this method has drawbacks as follows:

1. The metal plate member and the plastic plate member are separately made, complicating the manufacturing process and increasing the manufacturing cost.

2. After hardened, the volume of the adhesive is slightly reduced (due to vaporization of fluid), and tiny open spaces may exist in between the metal plate member and the plastic plate member, lowering the product yield rate.

3. The metal plate member and the plastic plate member may be twisted when the user opens or closes the electronic product, and the torsional force thus produced may cause separation of the adhesive from the metal plate member and/or the plastic plate member, resulting in plate member separation damage.

4. When bonding the metal plate member and the plastic plate member together, the hardening time of the applied adhesive prolongs the product manufacturing time. Further, the use of the adhesive relatively increases the manufacturing cost of the product, weakening the competitive advantage.

SUMMARY OF THE INVENTION

The present invention has been accomplished under the circumstances in view. It is the main object of the present invention to provide a plate member joining structure formed of a metal plate member and a plastic plate member, which has high tensile strength and which avoids separation between the metal plate member and the plastic plate member.

To achieve these and other objects of the present invention, a plate member joining structure comprises a metal plate member having opposing outer face and bonding face and a plastic plate member directly molded on the bonding face of the metal plate member by insert molding. The metal plate member has binding units located on the bonding face. Each binding unit comprises a plurality of binding strips formed of a part of the bonding face and curvedly protruded from the bonding face and arranged in a spiral manner. The binding strips are embedded in the plastic plate member to enhance the binding strength between the metal plate member and the plastic plate member.

DETAILED DESCRIPTION OF THE PREFERRED EMBODIMENT

Figure 1:
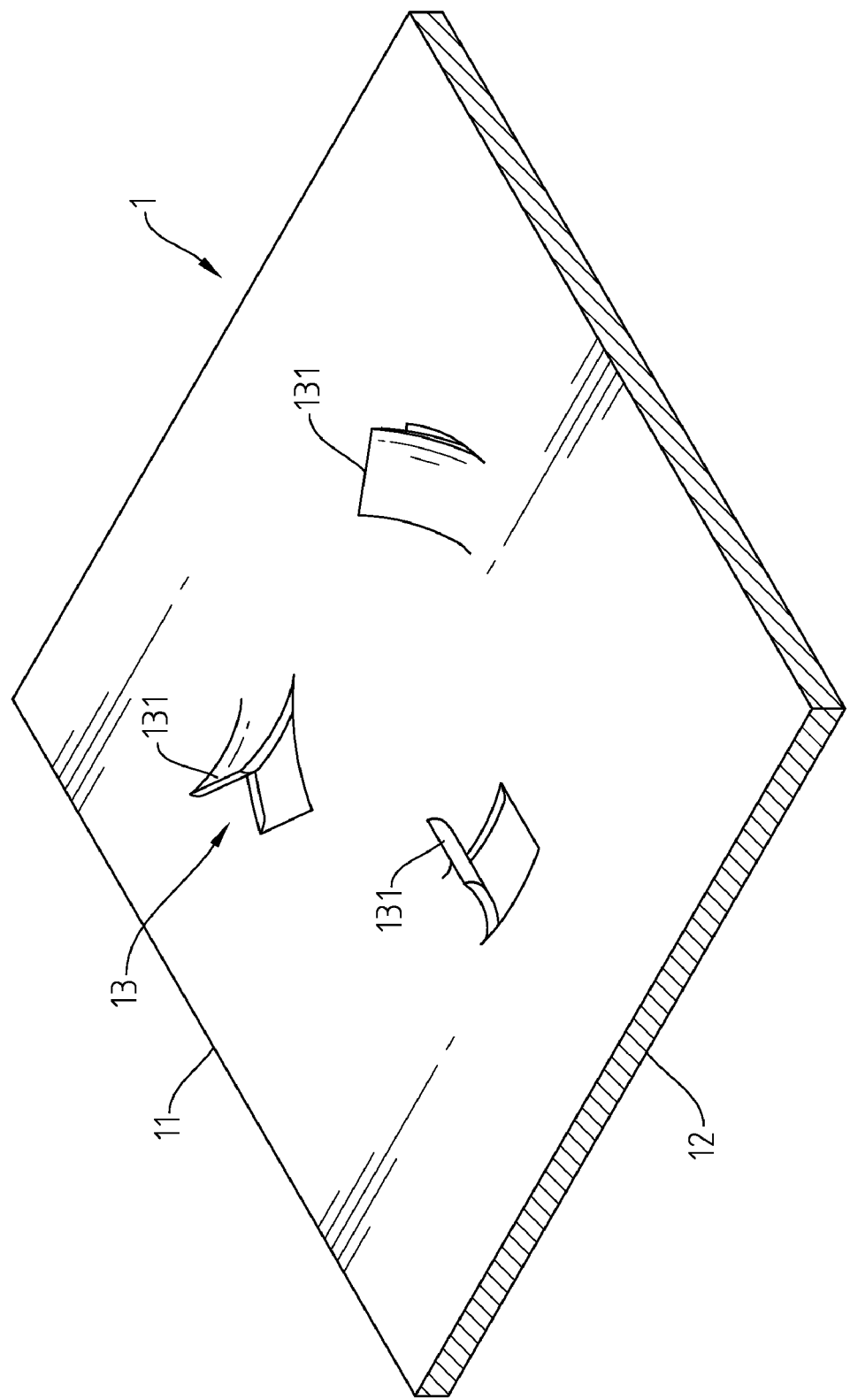
FIG. 1 is an elevational view of a part of a metal plate member for plate member joining structure in accordance with a first embodiment of the present invention.
Figure 2:
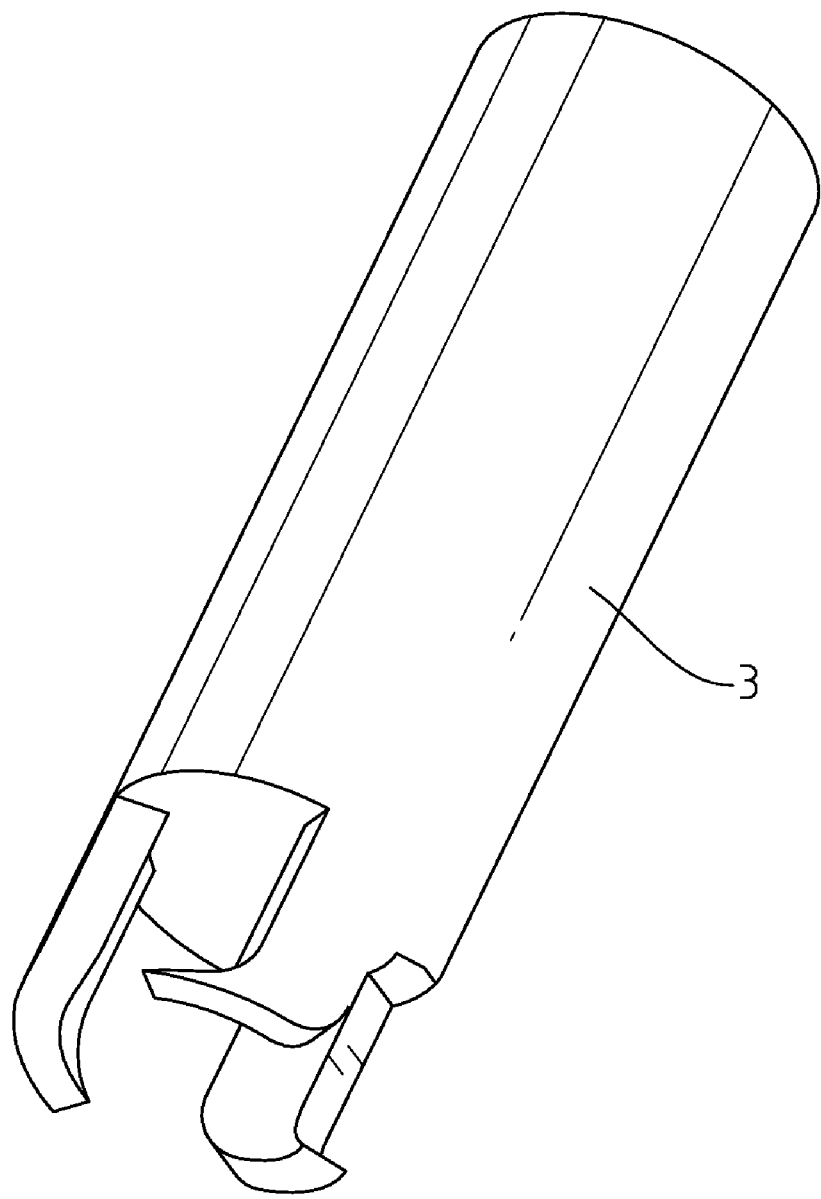
FIG. 2 is a schematic drawing illustrating a cutting tool used for the production of the plate member joining structure in accordance with the first embodiment of the present invention.
Figure 3:
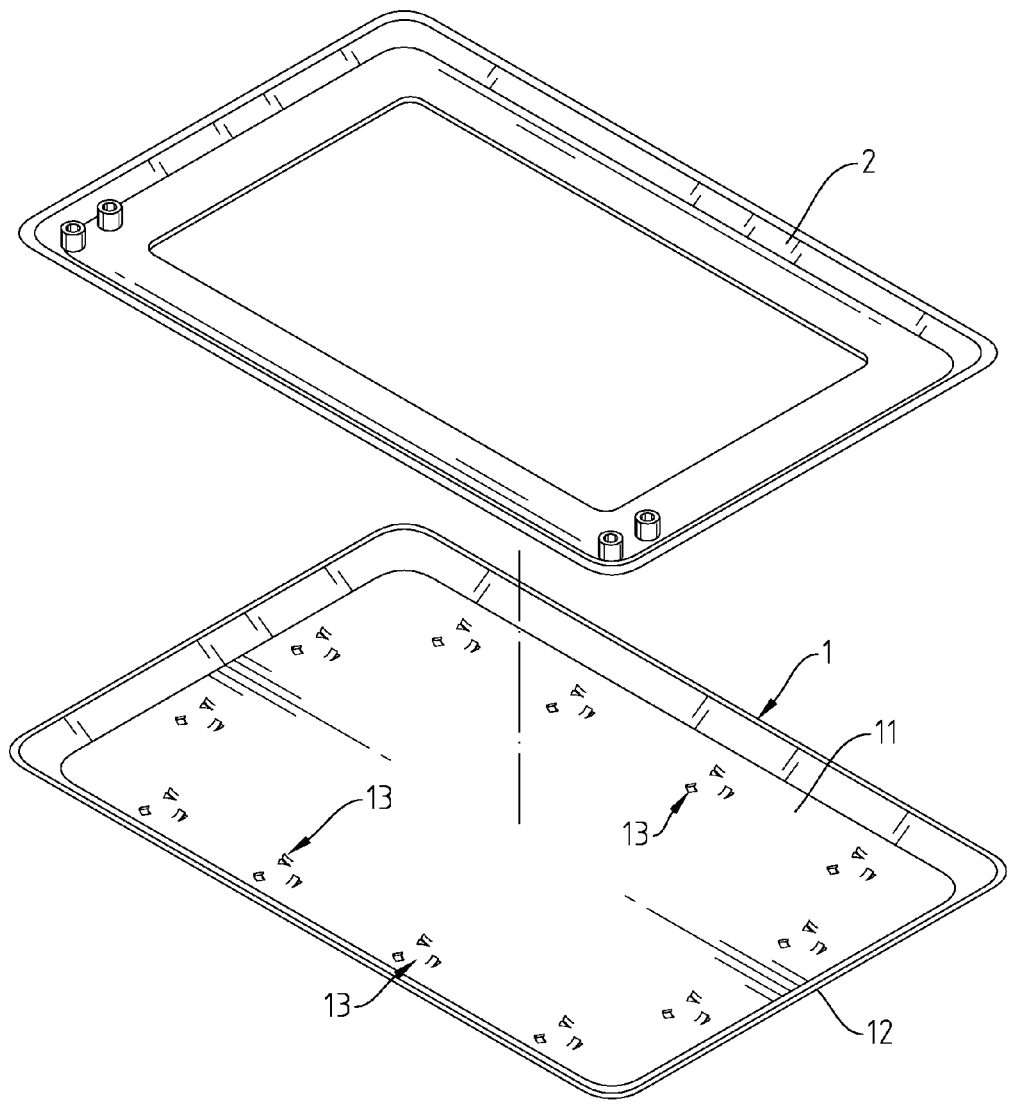
FIG. 3 is an exploded view of a plate member joining structure in accordance with the first embodiment of the present invention.
Figure 4:
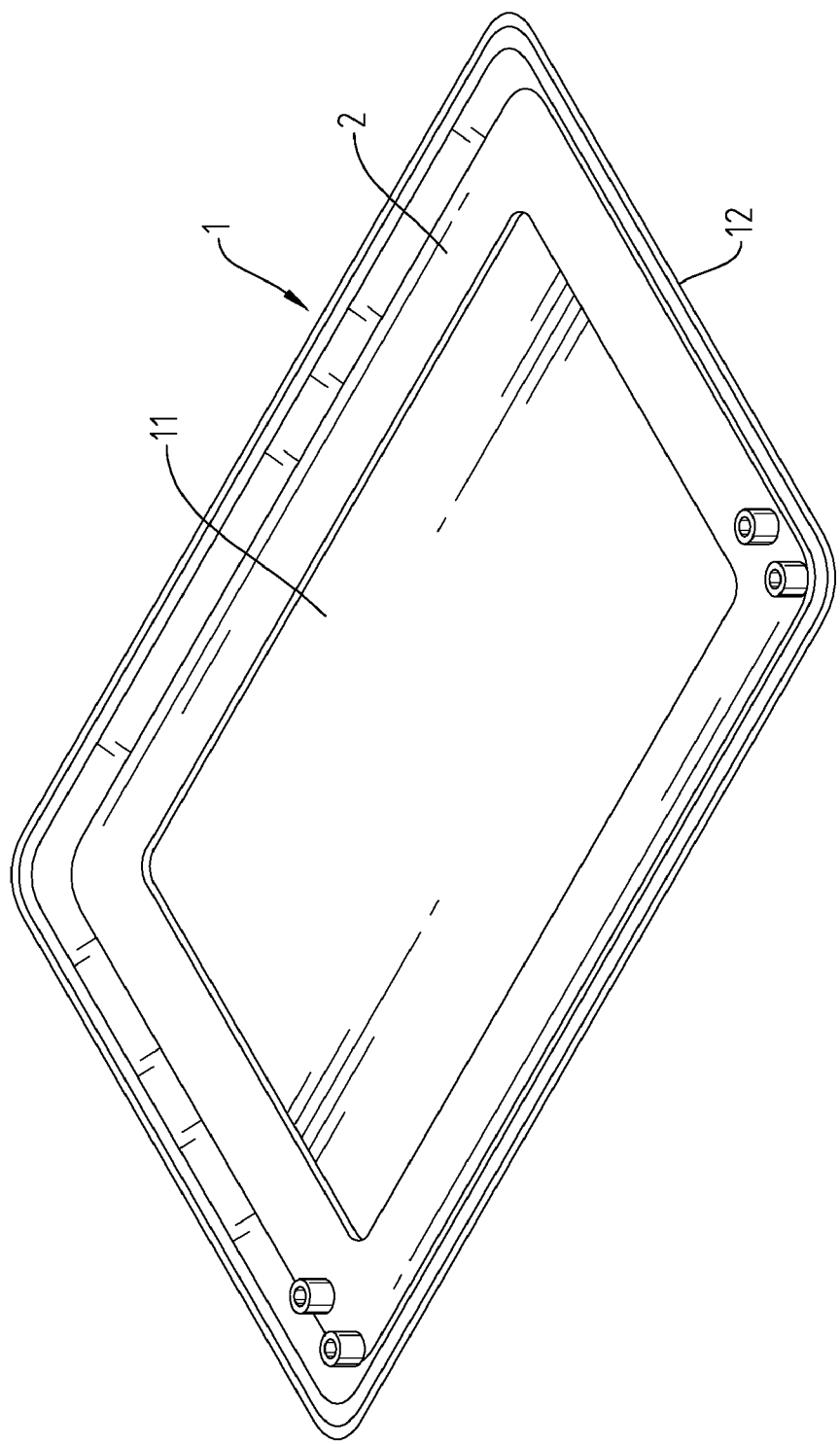
FIG. 4 is an elevational view of the plate member joining structure in accordance with the first embodiment of the present invention.

Referring to FIGS. 1 and 2, a plate member joining structure in accordance with the present invention comprises a metal plate member 1. The metal plate member 1 has opposing outer face 12 and bonding face 11, and a plurality of binding units 13 located on the bonding face 11. Each binding unit 13 includes a plurality of binding strips 131 formed of a part of the bonding face 11 and respectively curvedly protruded from the bonding face 11 and arranged in a spiral manner. Each binding unit 13 is formed by using a cutting tool 3 to cut and rotatably lift a part of the bonding face 11.

Figure 5:
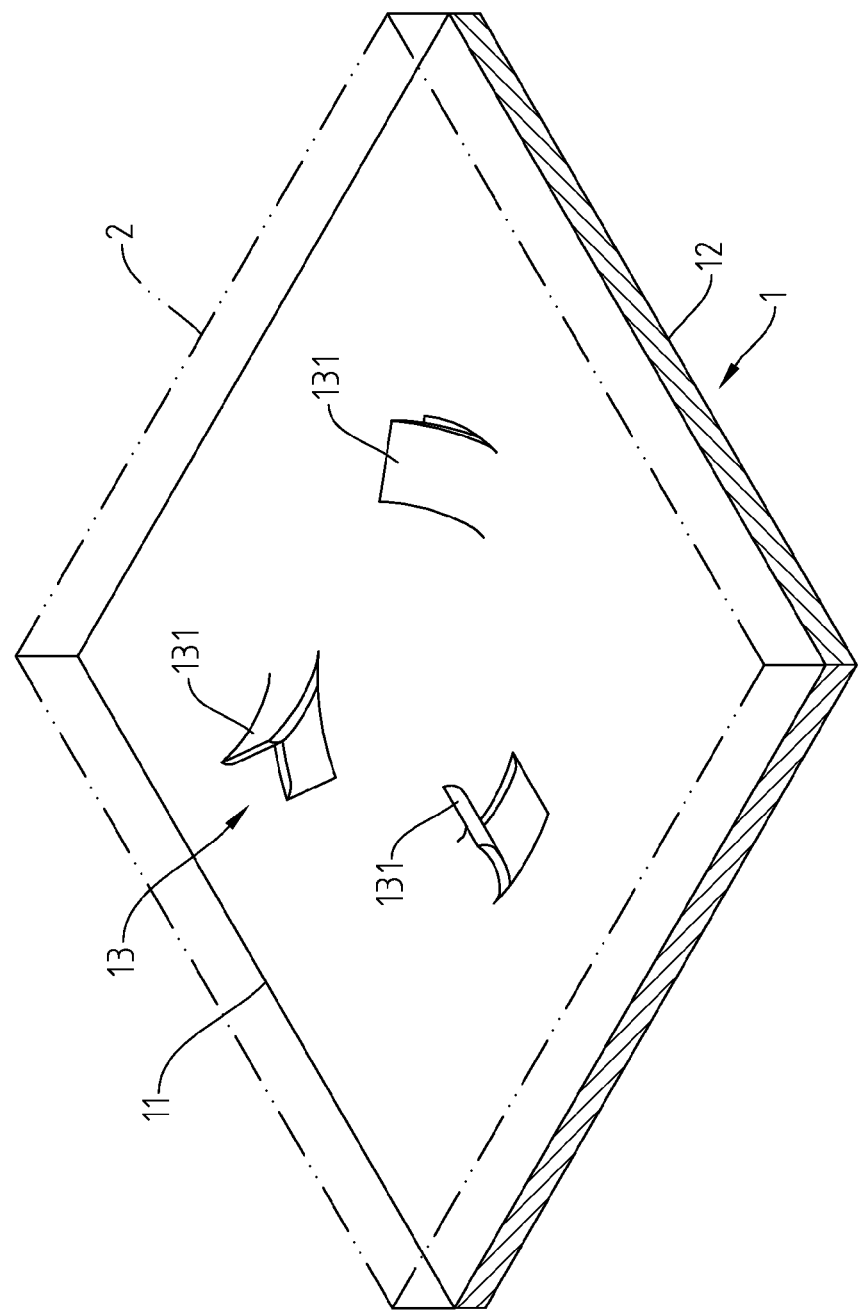
FIG. 5 is a schematic perspective view, in an enlarged scale, of a part of the plate member joining structure in accordance with the first embodiment of the present invention.
Figure 6:
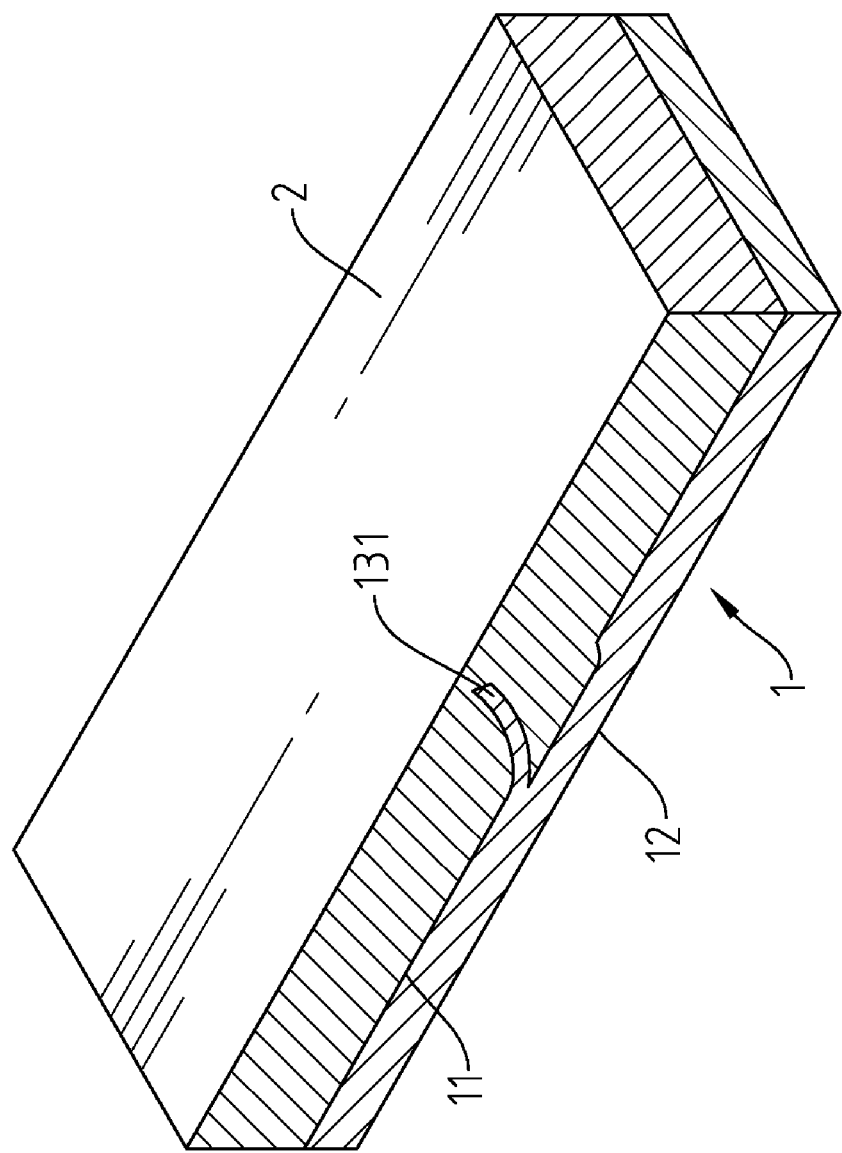
FIG. 6 is a sectional elevation in an enlarged scale of a part of the plate member joining structure in accordance with the first embodiment of the present invention.

Referring to FIGS. 1-6, a cutting tool 3 is used and operated to cut the bonding face 11 of the metal plate member 1 so that an array of binding units 13 is formed at the bonding face 11. Thereafter, the metal plate member 1 is put in an insert molding machine (not shown) and then a plastic plate member 2 is molded on the bonding face 11 of the metal plate member 1 by insert molding. After molding of the plastic plate member 2 on the bonding face 11 of the metal plate member 1, as shown in FIGS. 5 and 6, the binding strips 131 of the binding units 13 are embedded in the plastic plate member 2, i.e., the metal plate member 1 and the plastic plate member 2 are tightly bonded together.

Figure 7:
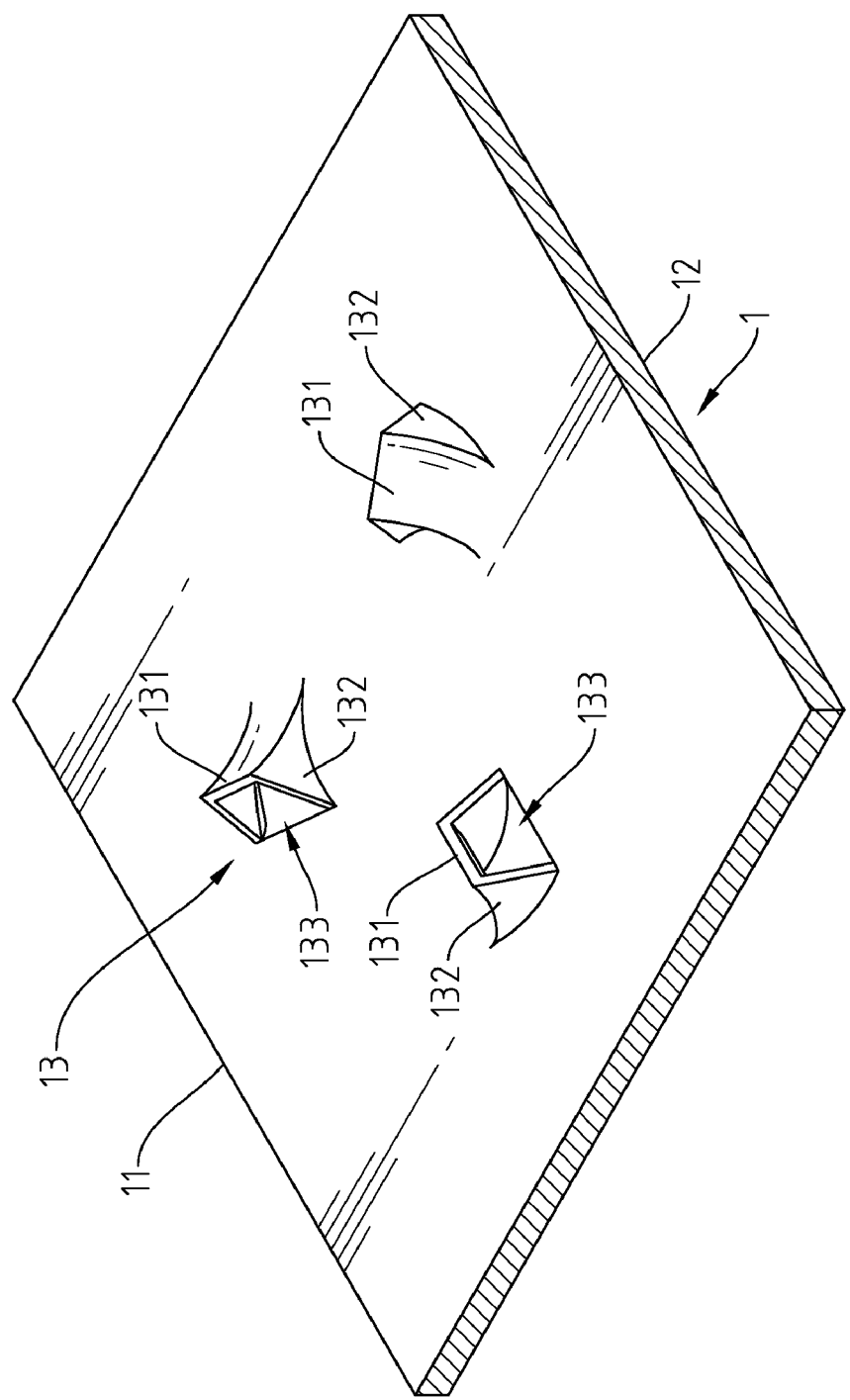
FIG. 7 is an elevational view of a part of a metal plate member for plate member joining structure in accordance with a second embodiment of the present invention.
Figure 8:
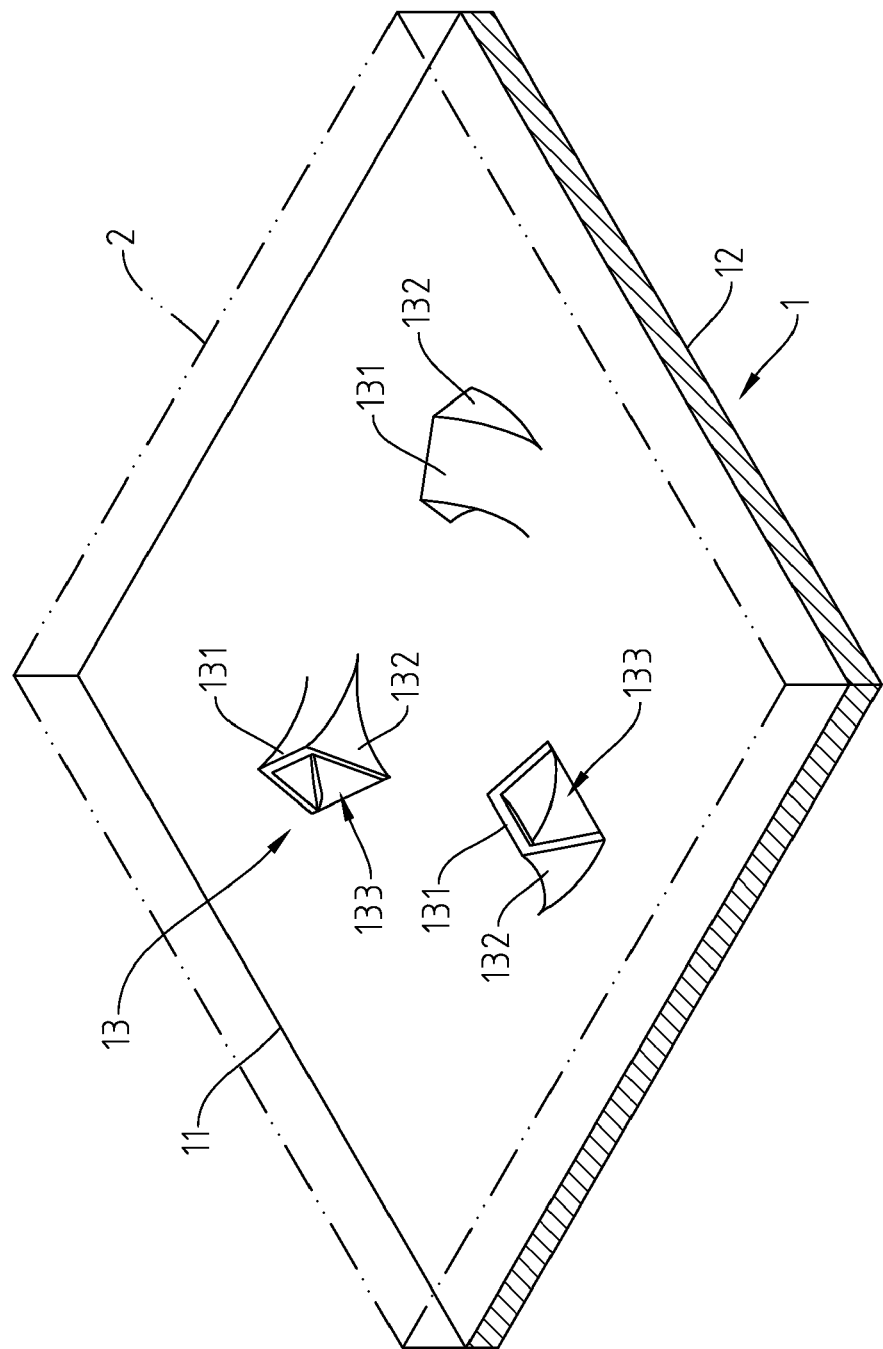
FIG. 8 is a schematic perspective view, in an enlarged scale, of a part of the plate member joining structure in accordance with the second embodiment of the present invention.

According to an alternate form of the present invention, as shown in FIGS. 7 and 8, each binding unit 13 of the metal plate member 1 comprises a plurality of binding strips 131 formed of a part of the bonding face 11 and respectively curvedly extending from the bonding face 11 at a predetermined angle and arranged in a spiral manner, two side ribs 132 bilaterally connected between the bonding face 11 and each binding strip 131, and a chamber 133 formed in the bonding face 11 and surrounded by one binding strip 131 and the associating two side ribs 132. After bonding of the plastic plate member 2 on the metal plate member 1, the binding strips 131 and side ribs 132 of the binding units 13 are embedded in the plastic plate member 2, and the plastic material of the plastic plate member 2 filled up the chambers 133, enhancing the binding strength between the metal plate member 1 and the plastic plate member 2.

In conclusion, the invention provides a plate member joining structure that has the advantages over the prior art designs subject to the technical features as follows:

1. After molding of the plastic plate member 2 on the bonding face 11 of the metal plate member 1, the binding strips 131 of the binding units 13 are embedded in the plastic plate member 2, enhancing the binding strength between the metal plate member 1 and the plastic plate member 2 and avoiding separation between the metal plate member 1 and the plastic plate member 2.

2. The binding strips 131 of each binding unit 13 are arranged in a spiral manner so that the binding strips 131 can enhance the torsional strength of the finished plate member joining structure, avoiding separation between the metal plate member 1 and the plastic plate member 2.

3. Because the binding units 13 are formed at the bonding face 11 by means of using a cutting tool 3 to lift a part of the bonding face 11 of the metal plate member 1 but not by means of extrusion deformation, the outer face 12 is kept intact.

4. Because the plate member joining structure is made by means of molding the plastic plate member 2 on the bonding face 11 of the metal plate member 1 by insert molding, the invention has the characteristics of simple manufacturing process and low manufacturing cost.

Although particular embodiments of the invention have been described in detail for purposes of illustration, various modifications and enhancements may be made without departing from the spirit and scope of the invention.

What is claimed is:

1. A plate member joining structure, comprising:
a metal plate member, said metal plate member comprising opposing outer face and bonding face, and at least one binding unit located on said bonding face, each said binding unit comprising a plurality of binding strips formed of a part of said bonding face and respectively curvedly protruded from said bonding face and arranged in a spiral manner, each said binding unit further comprising a plurality of side ribs connected between said bonding face and two opposite lateral sides of each said binding strip; and
a plastic plate member directly molded on said bonding face of said metal plate member by insert molding to have said binding strips be embedded in said plastic plate member.

2. The plate member joining structure as claimed in claim 1, wherein said metal plate member comprises multiple binding units located on said bonding face.

3. The plate member joining structure as claimed in claim 1, wherein the binding strips of each said binding unit are made by using a cutting tool to cut and rotatably lift a part of said bonding face of said metal plate member.

\* \* \* \* \*